United States Patent Office 3,329,636
Patented July 4, 1967

3,329,636
ASPHALT-CONTAINING COMPOSITIONS AND
METHOD FOR THEIR PREPARATION
Leonard Henschel, Flushing, N.Y., assignor to Mobil Oil
Corporation, a corporation of New York
No Drawing. Filed Nov. 5, 1963, Ser. No. 321,408
4 Claims. (Cl. 260—28.5)

This invention relates to new and useful asphalt-containing compositions. In one of its aspects, the invention relates to new and useful asphalt-containing compositions suitable for use as binders, adhesives, sealants or coatings. Still more particularly in this aspect, the invention relates to improved asphalt-containing compositions, suitable for the aforementioned purposes, and which are capable of satisfactory performance under severe environmental conditions and over a wide temperature range.

Raw asphalt, is, generally, commercially produced in the form of heavy bottoms obtained by the prior removal of the distillate portion of naphthenic or mixed-base crudes. This raw asphalt, as obtained from the crude still, is exceedingly tough and flexible and can be used in various applications, such as a binding agent in combination with other materials, or as a paving material, and also as a coating material. A problem encountered in the use of raw asphalt, for these purposes, is the characteristic of this material to soften with rising temperatures, and even to melt, in many instances, at relatively low temperatures, for example, from about 80° F. to about 100° F., thus rendering it unsuitable for its intended use.

The aforementioned characteristic defects of raw asphaltic materials are well known to the art. It has been the practice, heretofore, to treat asphalt for the purpose of obtaining a material which is better able to withstand the deleterious effects of elevated temperatures. Conventional treatment, for this purpose, involves blowing heated asphalt with air in a tank maintained at elevated temperature. This blowing treatment is conducted for long periods of time until the asphalt has been oxidized to form a more heat-resistant product. Thus, for example, in practice, a Kuwait asphalt, having a softening point of 85° F. by the standard Ring and Ball Test, can be air-blown at elevated temperature to produce a product having a Ring and Ball softening point of 240° F. Such air-blown asphalt will show a standard penetration of 8 at 77° F., 100 grams/5 seconds, ductility of 0 at 77° F., and a solubility in carbon tetrachloride of about 99.5%.

The air-blowing of asphalt requires the use of bulky-expensive equipment for long periods of time, and, it must be carefully supervised over this lengthy period of treatment. Furthermore, the treatment cannot be conducted outside of the treating vessel. In addition, the penetration of air-blown asphalt is not sufficiently high for the many possible uses of this material. The use of asphalt in combination with various additive materials has also been suggested, but even in such practice the resulting compositions have been found to fall far short of the desired achievement of such important properties as toughness, shear tensile-load strength, flexibility, and suitability for use over wide temperature ranges.

It is, therefore, an object of the present invention to provide new and useful asphalt-containing compositions.

Another object of the invention is to provide new and useful asphalt-containing compositions having improved physical properties and which are suitable for use over wide temperature ranges.

Still another object of the invention is to provide a new and useful method for obtaining the aforementioned improved asphalt-containing compositions.

Other objects and advantages inherent in the invention will become apparent to those skilled in the art from the following detailed disclosure.

In accordance with the present invention, there are provided new and useful asphalt-containing compositions having improved properties of toughness, shear tensile-load strength, flexibility and suitability for use over wide temperature ranges, making them particularly useful as binders, adhesives, sealants or coatings. Of particular utility is the use of these compositions as adhesives, in place of e.g. starch, heretofore employed, for sealing flat sheets to corrugated surfaces, e.g. papers, thus eliminating the necessity for large-scale costly equipment for heating the paper and curing the starch. Another useful field of application is the manufacture of cement bags and other laminated containers, wherein hot adhesives have heretofore been employed. Still another important use resides in the manufacture of reinforced laminates combined with woven, or nonwoven, natural or synthetic fibers, or mixtures thereof. Furthermore, these asphaltic compositions can also be used for application to such materials as fiberboard, or as a coating for paving materials, or seal coatings.

The improved compositions of the present invention, as more fully hereinafter described, are prepared, in general, by heating a mixture comprising a major portion of a petroleum asphalt and a minor portion of an olefin polymer prepared from olefins having from 2 to 3 carbon atoms, and a minor portion of a halogenated polyphenyl resin at a temperature within the range from about 200° F. to about 600° F., and preferably, from about 450° F. to about 550° F., to produce an improved asphaltic composition, possessing the aforementioned desired properties of toughness, shear tensile-load strength, flexibility, and suitability for use over wide temperature ranges.

As indicated above, the mixtures from which the improved compositions of the present invention are prepared comprise a major portion of a petroleum asphalt and minor portions of the olefin polymer and halogenated polyphenyl resin. In general, the asphalt is preferably present in an amount from about 70 to about 95 percent, by weight, of the total mixture. More advantageously, the asphalt is employed in an amount from about 80 to about 90 percent, by weight of the total mixture. The petroleum asphalt employed in the aforementioned mixture may comprise a virgin asphalt obtained by removing the distillate from a naphthenic or mixed-base crude oil; or can comprise a residue obtained from a vacuum reduced or steamed-stripped crude oil; or a blown-asphalt from a solvent tar or asphalt residue.

The olefin polymers, as indicated above, are prepared from olefins having from 2 to 3 carbon atoms, and comprise a minor portion of the mixture employed for forming the novel compositions of the present invention. In general, the olefin polymer is, preferably, present in an amount from about 3 to about 15 percent, by weight, of the total mixture. Most advantageously, the olefin polymer is employed in an amount from about 5 to about 10 percent, by weight, of the total mixture. This olefin polymer comprises either an ethylene or propylene polymer, and is of the commercially available linear, or straight-chain, high-density types, and possesses a relatively low melt-index. Thus, a preferred polyethylene, for the purposes of the present invention, comprises a polyethylene having a density range from about 0.942 to about 0.965. Preferred polypropylenes have a density range from about 0.90 to about 0.91.

The halogenated polyphenyl resin, as indicated above, comprises a minor portion of the mixture employed for forming the novel compositions of the present invention. In general, this resin is preferably present in an amount from about 2 to about 15 percent, by weight, of the total mixture. Most advantageously, the resin is employed in an amount from about 5 to about 10 percent, by weight, of the total mixture. These halogenated polyphenyl resins are commercially halogenated hydrocarbons of the type manufactured by Monsanto Chemical Company, St. Louis, Mo., under the tradename "Montar." Of particular importance are the chlorinated polyphenyl resins. These resins are solids, varying in appearance from dark brown to black. They possess softening points ranging from about 54° C. to about 206° C. (ASTM, E28–51T). They are slightly basic and possess a chlorine content from about 36 to about 56 percent; a calcium oxide-content from about 1 to about 15 percent; and an ion-content from about 0.1 to about 1.0 percent.

As indicated above, the improved compositions comprising the petroleum asphalt, olefin polymer and halogenated polyphenyl resin, are obtained by reacting a mixture of these components at a temperature from about 200° F. to about 600° F., and, preferably, at a temperature from about 450° F. to about 550° F., for a period of 1 to 4 hours. During this heat treatment the material undergoes a gel formation and is then converted to an almost infusible, insoluble composition. This composition is essentially a thermoplastic material, having a softening point (Ring and Ball test) from about 270° F. to about 320° F., and is unusual in that it can perform, in the capacities indicated, as, for example, a hot-melt adhesive over a wide temperature range. Thus, it is found that when these novel compositions are applied as adhesives to seal flat sheets to corrugated paper, the product is sufficiently stable and flexible for retaining firm bonds under stress in the range of from about 0° F. to about 150° F. In this respect, it should be noted that the cold-flexibility test comprises bending a laminated sample around a 1″ mandrel at 0° F., without cracking. The high temperature test comprises subjecting the bond to a shear tensile-load of 1000 grams per square inch at 150° F.

The following examples will serve to illustrate the preparation of the aforementioned novel and improved asphaltic compositions of the present invention, and to demonstrate their utility and effectiveness as evidenced by respective softening points, penetrations, and other characteristic data obtained.

*Example 1*

An asphaltic composition was prepared, comprising, by weight, (a) 70 percent Augusta asphalt (195/205° F., softening point R&B), which was blown from a straight-run residuum (140° F. softening point, R&B); (b) 10 percent, high-density polyethylene (molecular weight of 150,000); and (c) 20 percent chlorinated polyphenyl resin, having a softening point (ASTM, E28–51T), of 155–195° C.; slightly basic; a chlorine-content of 53 to 55 percent; a calcium oxide-content of 1 to 3 percent; and an iron-content of 0.1 to 0.2 percent, and manufactured by Monsanto Chemical Company under the tradename "Montar 5."

The processing of the aforementioned components was carried out in a Cowles Dissolver operated at 1900 to 2500 r.p.m. The polyethylene was added to one-half of the asphalt at a temperature of 480° F., and this mixture was stirred for a period of one hour, with gradual raising of the temperature to 520° F. During this period the mixture first formed a gel and then changed to a homogeneous viscous melt. The remaining half of the asphalt and the chlorinated polyphenyl resin was then added to the aforementioned melt at a temperature of 480° F. The thus-combined mixture was then stirred for an additional period of one-half hour, with gradual raising of the temperature to about 500–530° F. The properties of the final product thus obtained, were as follows:

| | |
|---|---|
| Specific gravity 77/77° F. | 1.072 |
| Softening point (R&B), ° F. | 294 |
| Penetration: | |
| 77/100/5 | 3 |
| 115/100/5 | 11 |
| 130/100/5 | 15 |
| 140/100/5 | 20 |
| 150/100/5 | 26 |
| Flash, COC, ° F. | 580 |
| Furol viscosity at 400° F., sec. | 29,813 |
| Barber stain No. | 2 |
| Paper shear test (1000 g. load–150° F.), hrs. | (¹) |
| Mandrel bend (1″ @ 0° F.) | Pass |

¹ Over 4 days.

*Example 2*

Employing the same asphalt, polyethylene and chlorinated polyphenyl resin, and following the same procedural steps as described in Example 1, an asphaltic composition was obtained comprising, by weight, (a) 80 percent asphalt; (b) 10 percent polyethylene, and (c) 10 percent of the resin.

The properties of the final product, thus obtained were as follows:

| | |
|---|---|
| Specific gravity 77/77° F. | 1.032 |
| Softening point (R&B), ° F. | 283 |
| Penetration: | |
| 77/100/5 | 4 |
| 115/100/5 | 16 |
| 130/100/5 | 22 |
| 140/100/5 | 27 |
| 150/100/5 | 35 |
| Flash, COC, ° F. | 580 |
| Furol viscosity at 400° F., sec. | 15,566 |
| Barber stain No. | 2 |
| Paper shear test (1000 g. load–150° F.), hrs. | 14 |
| Mandrel bend (1″ @ 0° F.) | Pass |

*Example 3*

Employing the same asphalt, polyethylene and chlorinated polyphenyl resin and following the same procedural steps, as disclosed in Example 1, an asphaltic composition was obtained comprising, by weight, (a) 85 percent asphalt; (b) 10 percent polyethylene; and (c) 5 percent of the resin.

The properties of the final product, thus obtained, were as follows:

| | |
|---|---|
| Specific gravity 77/77° F. | 1.014 |
| Softening point (R&B), ° F. | 281 |
| Penetration: | |
| 77/100/5 | 6 |
| 115/100/5 | 20 |
| 130/100/5 | 31½ |
| 140/100/5 | 34 |
| 150/100/5 | 38 |
| Flash, COC, ° F. | 580 |
| Furol viscosity at 400° F., sec. | 11,120 |
| Barber stain No. | 2 |
| Paper shear test (1000 g. load—150° F.), hrs. | 5 |
| Mandrel bend (1″ at 0° F.) | Pass |

*Example 4*

This example is intended to show the criticality for the presence of the aforementioned resin to upgrade the asphalt-polyolefin composition, in order to insure such properties as toughness, shear tensile-load strength and flexibility.

Employing the same asphalt, polyethylene (but omitting the polyphenyl resin), and following the same procedural steps, as described in Example 1, as asphaltic composition was obtained comprising, by weight (a) 90 percent asphalt; and (b) 10 percent polyethylene.

The properties of the final product, thus obtained were as follows:

| | |
|---|---|
| Specific gravity 77/77° F. | 0.9874 |
| Softening point (R&B), ° F. | 274 |
| Penetration: | |
|    77/100/5 | 6 |
|    115/100/5 | 21½ |
|    130/100/5 | 29 |
|    140/100/5 | -- |
|    150/100/5 | 41 |
| Flash, COC, ° F. | 610 |
| Barber stain No. | 3 |
| Paper shear test (1000 g. load—150° F.), hrs. | 2.5 |
| Mandrel bend (1″ at 0° F.) | Pass |

The above composition was found to comprise a softer product and is not considered acceptable with respect to shear tensile-load strength. By repeating the procedure described in the above examples, and with similar operating conditions, various other petroleum asphalts, polyethylenes and polypropylenes, and halogenated polyphenyl resins, such as those previously described, can be substituted for those employed in the above examples, and similar improved asphaltic compositions can be obtained.

While preferred embodiments of the novel asphaltic compositions of the present invention, and the method for their preparation, have been described for the purpose of illustration, it will be understood that various modifications and adaptations thereto, which will be obvious to those skilled in the art, may be made without departing from the spirit of the invention.

I claim:
1. A composition comprising from about 70 to about 95 percent, by weight, of a petroleum asphalt having a softening point of from 195 to 205° F. (R&B) and blown from a straight-run residuum (140° F. softening point, R&B), from about 3 to about 15 percent, by weight, of an olefin polymer selected from the group consisting of high density polyethylene and polypropylene, and from about 2 to about 15 percent, by weight, of a chlorinated polyphenyl resin having a softening point of 155–195° C.

2. A composition comprising from about 80 to about 90 percent, by weight, of a petroleum asphalt having a softening point of from 195 to 205° F. (R&B) and blown from a straight-run residuum (140° F. softening point, R&B), from about 5 to about 10 percent, by weight, of an olefin polymer selected from the group consisting of high density polyethylene and polypropylene, and from about 5 to about 10 percent, by weight, of a chlorinated polyphenyl resin having a softening point of 155–195° C.

3. A laminate containing as a binder the composition defined by claim 1.

4. A laminate reinforced with a fiber-containing material and containing as a binder the composition defined by claim 1.

References Cited

UNITED STATES PATENTS

| | | | |
|---|---|---|---|
| 2,635,085 | 4/1953 | Gonnard | 260—28.5 |
| 3,147,266 | 9/1964 | Steletz | 260—28.5 |

FOREIGN PATENTS 858,121    12/1952    Germany.

MORRIS LIEBMAN, *Primary Examiner.*

JULIUS FROME, *Examiner.*